(12) United States Patent
Payen

(10) Patent No.: US 8,047,465 B2
(45) Date of Patent: Nov. 1, 2011

(54) COMPOSITE ANTI-CRASH STRUCTURE WITH LATERAL RETENTION, FOR AN AIRCRAFT

(75) Inventor: Hervé Payen, Velaux (FR)

(73) Assignee: Eurocopter, Marignane Cedex (FR)

( * ) Notice: Subject to any disclaimer, the term of this patent is extended or adjusted under 35 U.S.C. 154(b) by 640 days.

(21) Appl. No.: 11/698,042

(22) Filed: Jan. 26, 2007

(65) Prior Publication Data

US 2008/0023583 A1    Jan. 31, 2008

(30) Foreign Application Priority Data

Jan. 27, 2006   (FR) ...................................... 06 00773

(51) Int. Cl.
*B64C 1/00*       (2006.01)
(52) U.S. Cl. ..................................... 244/17.11; 244/119
(58) Field of Classification Search ............... 244/17.11, 244/119, 120, 118.1, 117 R
See application file for complete search history.

(56) References Cited

U.S. PATENT DOCUMENTS

| | | | | |
|---|---|---|---|---|
| 3,616,113 A | * | 10/1971 | Sawyer | ........................ 220/683 |
| 4,062,994 A | * | 12/1977 | Millman et al. | ............... 428/101 |
| 4,084,029 A | | 4/1978 | Johnson et al. | |
| 4,531,695 A | * | 7/1985 | Swinfield | ...................... 244/119 |
| 4,593,870 A | * | 6/1986 | Cronkhite et al. | ........ 244/117 R |
| 4,734,146 A | | 3/1988 | Halcomb et al. | |
| 4,941,767 A | | 7/1990 | Kidd | |
| 5,024,399 A | * | 6/1991 | Barquet et al. | ................ 244/119 |
| 5,069,318 A | | 12/1991 | Kulesha et al. | |
| 5,451,015 A | * | 9/1995 | Cronkhite et al. | ........ 244/135 R |
| 6,019,316 A | | 2/2000 | Sarlin et al. | |
| 6,173,925 B1 | * | 1/2001 | Mueller et al. | ................ 244/219 |
| 6,334,738 B1 | * | 1/2002 | Juracko | ......................... 405/132 |
| 6,520,706 B1 | * | 2/2003 | McKague et al. | ............. 403/265 |
| 6,620,484 B1 | | 9/2003 | Bolukbasi et al. | |
| 6,718,713 B2 | | 4/2004 | McKague, Jr. et al. | |
| 6,945,727 B2 | * | 9/2005 | Christman et al. | ......... 403/109.8 |
| 6,959,894 B2 | * | 11/2005 | Hayashi | .................... 244/17.11 |
| 7,198,224 B2 | * | 4/2007 | Townsend et al. | ......... 244/17.11 |
| 2008/0099609 A1 | * | 5/2008 | Drost | ............................ 244/119 |

FOREIGN PATENT DOCUMENTS

| | | |
|---|---|---|
| DE | 44 17 889 | 11/1995 |
| FR | 2632604 | 12/1989 |
| FR | 2817608 | 6/2002 |
| WO | WO 03/018295 | 3/2003 |

* cited by examiner

*Primary Examiner* — Joshua Michener
*Assistant Examiner* — Brian M. O'hara
(74) *Attorney, Agent, or Firm* — Brooks Kushman P.C.

(57) ABSTRACT

A structure for an aircraft comprises a first wall and a second wall. The first wall comprises two jackets of composite material disposed on either side of an intermediate arrangement and further includes at least one soleplate enabling it to be secured to the second wall. The structure further includes at least one elongate member extending facing the jacket and spaced apart therefrom, the elongate member being secured to the soleplate or to the second wall and being arranged to act as a bearing surface for a portion of the first wall that becomes separated from the soleplate after rupture.

10 Claims, 3 Drawing Sheets

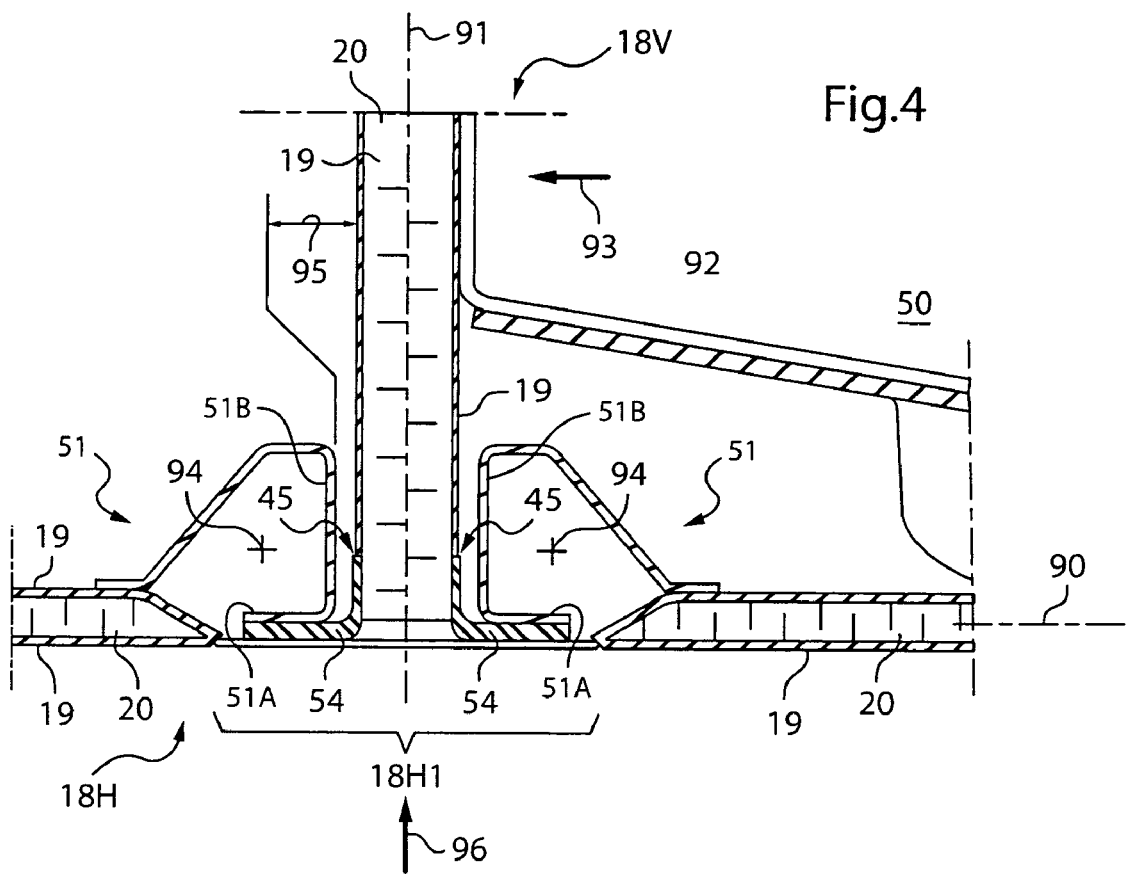
Fig.4
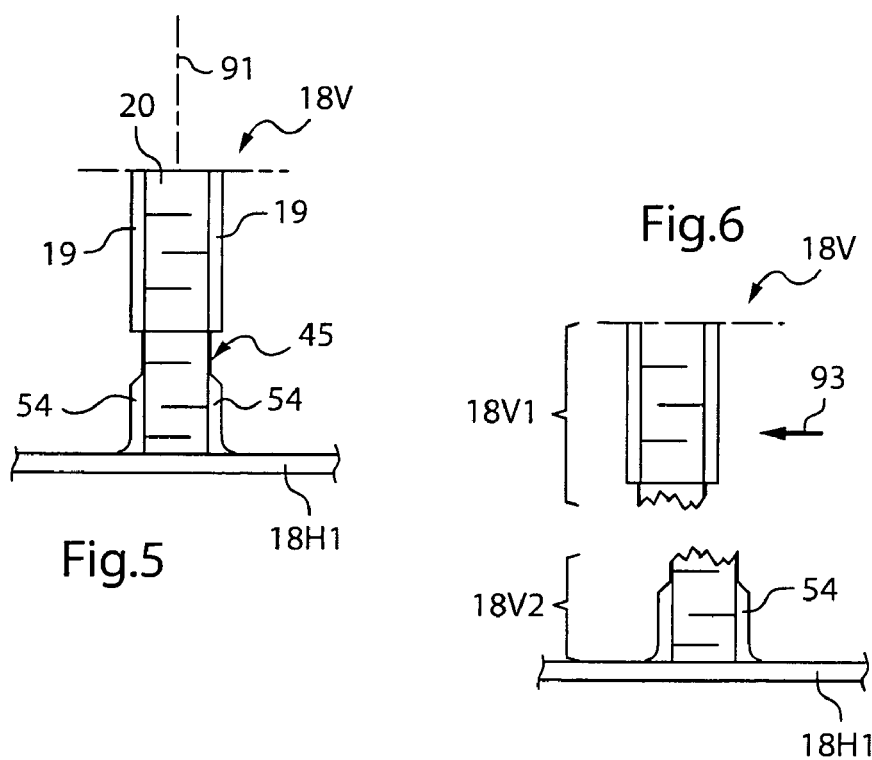
Fig.5
Fig.6

COMPOSITE ANTI-CRASH STRUCTURE WITH LATERAL RETENTION, FOR AN AIRCRAFT

The invention relates to a composite anti-crash structure for an aircraft, and also to an aircraft including such a structure.

The invention applies in particular to rotorcraft, and specifically to helicopters.

BACKGROUND OF THE INVENTION

The structure of such aircraft needs to be compatible with standardized functional constraints, and also with certification, in particular.

In the event of the aircraft impacting against the ground (crashing), structural damage must be limited and even prevented, in particular in the vicinity of the cabin and the vital components of the aircraft. All unacceptable injury to humans must be avoided.

At present, complying with certain specifications is in contradiction with obtaining functions that are desired for such and such a component of the aircraft, thus requiring compromises to be made that are not always acceptable in practice. This applies in particular to rotary wing aircraft.

The search for increasing the capacity of the structure of an aircraft to absorb energy due to an impact (accident) has lead to numerous proposals.

Patent FR-2 632 604 describes a helicopter structure comprising a frame that is essentially constituted by a gantry whose ends are connected together by a cross-member. A particular structure makes it possible to obtain controlled deformation of the cross-member by initiating buckling in the event of an impact.

U.S. Pat. No. 4,084,029, U.S. Pat. No. 4,734,146, and FR-2 817 608 relate to beams having a composite corrugated core that undulates with a sinusoidal shape.

Various other structures for absorbing energy in the event of an impact to the fuselage of an aircraft against the ground have also been proposed.

U.S. Pat. No. 6,620,484 describes an absorption structure comprising vertical composite panels having a thread stitched therein at a density that increases from the bottom of the structure towards its top portion.

U.S. Pat. No. 4,593,870 relates to an impact absorber that extends under the floor of a helicopter cabin and that comprises a crossed array of beams including a laminate or two laminates covering a honeycomb-structure core. Rupture-initiators are provided in the bottom of the laminate.

U.S. Pat. No. 4,941,767 describes intersecting planes with connections via ring-section parts.

U.S. Pat. No. 5,069,318 describes reinforcement surrounding a thin wall in order to stabilize its behavior in the event of a crash. U.S. Pat. No. 6,718,713 describes a preshaped member with a channel for inserting a plane partition. Document WO 03/018295 describes a member that is preshaped to the shape of the Greek letter "Pi", for assembling together composite-material parts.

The present invention applies in particular to rotorcraft in which the bottom structure includes a compartment that receives, or that is to receive, equipment (such as a fuel tank) that is liable, in the event of a crash, to exert thrust against a side wall of the compartment.

Patent FR-2 763 313 describes an installation for suspending a flexible fuel tank by means of straps within a compartment. In the event of a crash, the kinetic energy due to the mass of fuel causes the bottom partition of the compartment to rupture and subjects the straps to plastic deformation.

U.S. Pat. No. 5,451,015 describes a helicopter having a structure that includes a compartment receiving a flexible fuel tank; the compartment comprises four side walls and a bottom wall that are all reinforced by stiffeners. Polyurethane foam is provided between the flexible tank and said walls. The respective strengths of the foam and of the walls are adjusted such that in the event of an impact, the thrust from the fuel does not completely destroy the walls of the compartment.

OBJECT AND SUMMARY OF THE INVENTION

In spite of the above attempts, there remains a need for an improved structure for an aircraft for taking up the force and absorbing the energy that result from an impact.

To this end, in an aspect of the invention, there is provided an aircraft structure comprising a first wall and a second wall, the first wall comprising two jackets of composite material disposed on either side of an intermediate arrangement. The structure and/or the first wall includes at least one soleplate enabling the first wall to be secured to the second wall, and further includes at least one elongate member extending facing a jacket and spaced apart therefrom. The elongate member is secured to the soleplate or to the second wall and is arranged to serve as an abutment to a portion of the first wall that becomes separated from the soleplate as a result of the first wall itself rupturing.

In preferred embodiments of the invention:

the walls form part of a compartment that is to receive equipment, such as a fluid tank, that is liable to exert lateral thrust against the first wall;

the structure includes a floor; the first wall is in the form of a beam having its core extending along a first plane that is substantially perpendicular to the floor, and the second wall extends along a second plane that is inclined little relative to the floor, and said walls extend under the floor;

the elongate member is hollow and secured to the soleplate and/or to the second wall by adhesive bonding or by riveting, for example;

the elongate member is made of a composite material and presents a cross-section that is substantially identical (constant) over its entire length (like a section member), which cross-section presents an outline that is open;

the elongate member extends parallel to the soleplate and above it;

the elongate member includes a bearing face for bearing against the bottom portion of the first wall after rupture, which bearing face is substantially plane and extends substantially parallel to one of the jackets over a fraction only of the half-height of the first wall;

the jacket includes a zone of weakness in the form of a localized interruption in at least one layer of the jacket, this localized interruption extending above the soleplate, the elongate member extending above the interruption (in part);

each of the two jackets of the first wall includes at least one zone of weakness in order to encourage symmetrical degradation of the wall in the event of an impact in an axis contained in a plane along which the core of the first wall extends;

the structure comprises two substantially identical elongate members disposed on either side of the first wall, the elongate members co-operating with the soleplate to define a groove-shaped receptacle suitable for containing debris that results from the first wall rupturing and flattening; and the intermediate arrangement of at least one of the walls contains a cellular material such as a synthetic foam or a honeycomb structure.

In another aspect, the invention provides a rotary wing aircraft possessing at least one anti-crash composite structure in accordance with the invention.

The invention makes it possible to integrate energy-absorption means in an essentially composite structure for taking up forces, which means are capable of providing a remarkable amount of energy absorption during a crash, without harming the static strength of the structure.

BRIEF DESCRIPTION OF THE DRAWINGS

Other aspects, characteristics, and advantages of the invention appear from the following description which refers to the accompanying drawings that show preferred embodiments of the invention, without any limiting character.

FIG. 4 is a section view on a vertical plane (on IV-IV) of FIG. 3.

FIGS. 5 and 6 are two diagrammatic section views on a vertical plane, showing the connection between two such walls, respectively before and after one of the walls has ruptured.

MORE DETAILED DESCRIPTION

Figure 1:
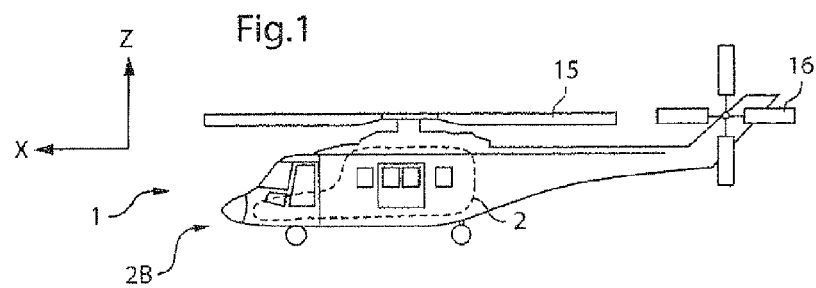
FIG. 1 is a diagrammatic longitudinal elevation view of a helicopter in accordance with the invention, seen from the side with its front or "nose" end to the left and its rear or "tail" end to the right.

In the drawings, where elements that are identical or similar are given the same reference numerals, there can be seen three mutually orthogonal axes.

A vertical or so-called elevation axis Z corresponds to the height and the thickness of the structures described: terms such as up/down or top/bottom are used relative thereto.

A horizontal or "longitudinal" axis X corresponds to the long or main dimension of the structures described. Terms such as front/rear are used relative thereto.

A horizontal or "transverse" axis Y corresponds to the width or lateral dimension of the structures described. The term "side" is used relative thereto.

The axes X and Y define a horizontal X,Y plane. The axes X and Z define a longitudinal (and vertical) X,Z plane. The axes Y and Z define a transverse (and vertical) plane Y,Z.

Figure 2:
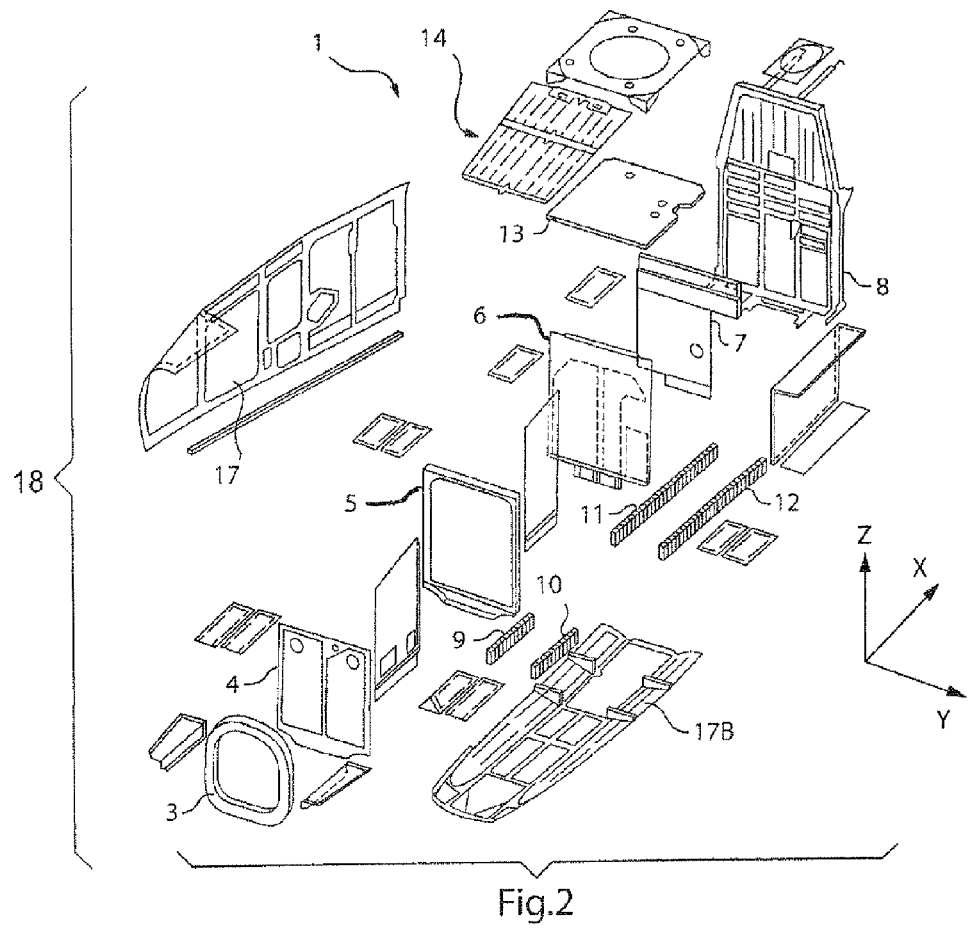
FIG. 2 is an "exploded" perspective view (seen from the side and from above) showing the structure of a helicopter of the invention, with its components being shown prior to assembly.

In FIGS. 1 and 2, the aircraft 1 is a helicopter comprising a fuselage 2B, a main rotor 15, and an anti-torque rotor 16. The invention can be implemented in other types of aircraft, both fixed-wing aircraft and lighter-than-air craft, for example.

In FIG. 1 or 2, there can be seen a force take-up structure 2. Such a structure 2 provides the fuselage 2B of the aircraft 1 with the stiffness it requires for its operation, both in terms of safety behavior and in the event of a crash.

As can be seen in FIG. 2 in particular, this force take-up structure 2 comprises load-carrier walls 18 in the form:

i) of transverse frames 3 to 8 numbered from the rear (to the left) to the front (to the right);

ii) longitudinal beams 9 to 12;

iii) a floor 13;

iv) a machine floor 14 suitable for supporting a main transmission gearbox coupled to the main drive and lift rotor 15 and also to the rear rotor 16; and v) partition-forming walls such as those referenced 17 and 17B serving to cover the structure 2 and forming the side and bottom portions of the fuselage 2B.

Figure 3:
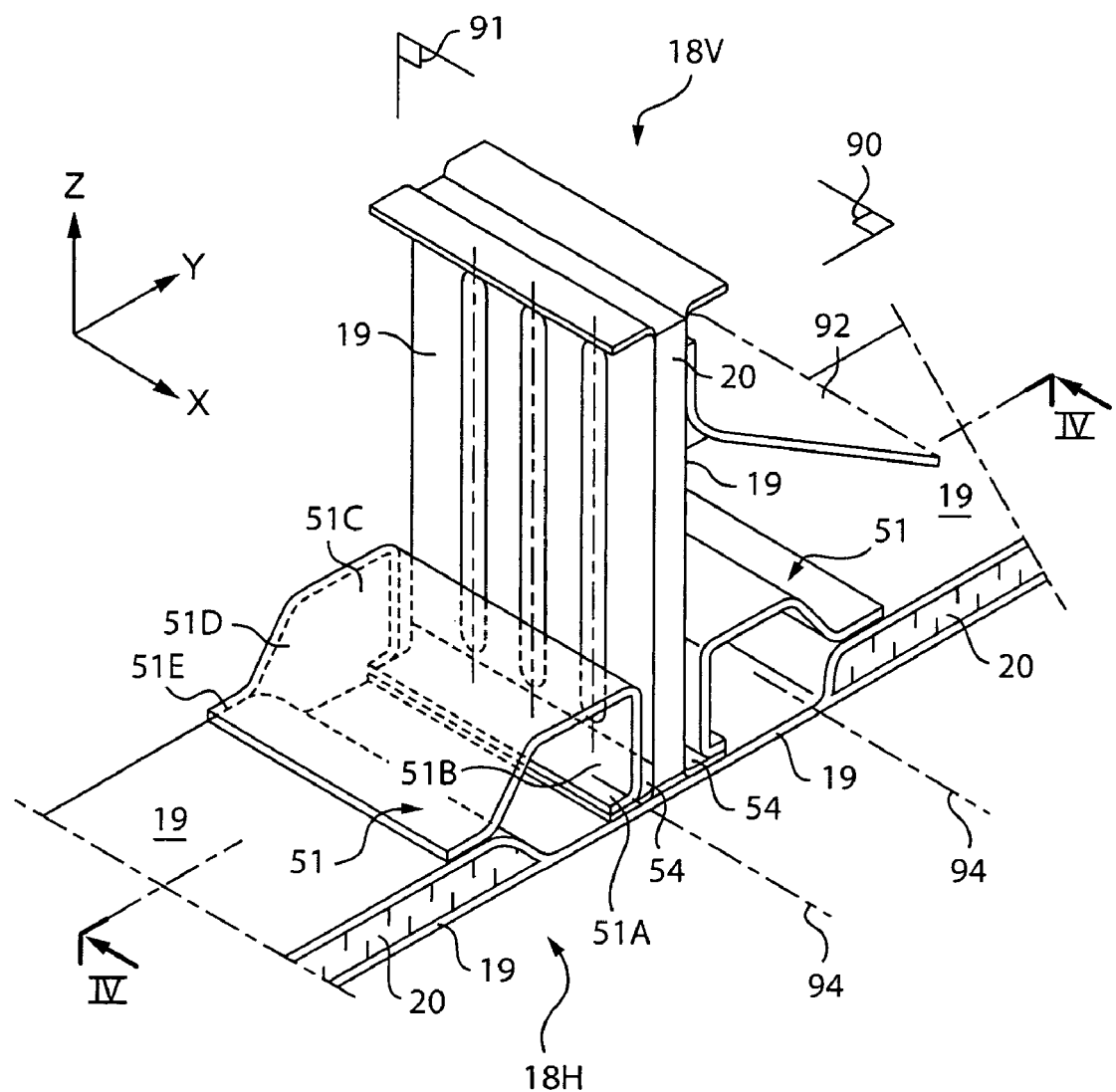
FIG. 3 is a simplified perspective view of the connection between two walls of a structure of the invention.

The force take-up structure 2 is of the composite (laminated) type. With reference to FIGS. 3 to 4 in particular, elements 3, 4, 5, 6, 7, 8, 9, 10, 11, 12, 13, 14, 17 and 17b of the structure 2 comprises generally plane outer jackets 19 on either side of an intermediate arrangement 20.

In FIGS. 3 and 4 in particular, the structure 2 has two walls 18H and 18V each comprising an assembly of jackets 19 and an arrangement 20. The skins or jackets 19 are made of a resin-impregnated fiber fabric. The composite material parts may be formed by hot-molding, e.g. molding at a temperature of about 180° C. The arrangement 20 is constituted by a honeycomb to which the jackets 19 are adhesively bonded.

Each jacket 19 may comprise a plurality of layers in a stack, for example:

an outer layer in the form of a composite fabric ply of impregnated carbon fibers extending substantially at an angle of about 45° relative to the main energy-absorption axis Z;

a middle layer in the form of a composite fabric ply of impregnated aramid fibers extending substantially at an angle of about 45° relative to the axis Z; and an intermediate layer in the form of a composite fabric ply of impregnated carbon fibers extending substantially at an angle of about 0° or 90° relative to the axis Z.

Other layers may also be provided having fibers extending at an angle of zero degrees (0°) relative to the axis Z. In such a stack, a distinction can be drawn between odd-numbered layers including the outer layer of the outer jacket 19 referred to as the "first" ply, and even-numbered layers possibly including an inner layer referred to as the "last" ply.

Certain layers of the wall may include fibers arranged internally in a crossed configuration, i.e. in the form of fibers extending in axes intersecting at a predetermined angle (e.g. 90°), from one sublayer to another. These sublayers may be resin impregnated together within a common substrate.

In other layers, the fibers are disposed in uniformly-oriented sheets, i.e. with fibers that are substantially parallel.

With reference to FIGS. 4 to 6, each jacket 19 of the beam 18V is secured at its bottom end to a soleplate 54 in the form of an angle iron having one flank extending against the jacket.

Furthermore, the intermediate arrangement 20 of the wall 18H is interrupted in register with the soleplates: the two jackets 19 of the respective left and right portions of the wall 18H are joined together to form a thin portion 18H1 onto which the two soleplates 54 are secured via their flanks extending parallel to the plane 90 in which the wall 18H extends.

The wall 18V extends along a plane 91 that is substantially perpendicular to the plane 90. When the structure is in its in-use position, the plane 91 is substantially vertical, while the plane 90 is substantially horizontal.

As shown in FIG. 5 in particular, each jacket 19 of the beam 18V presents a zone 45 of weakness that extends along the corresponding soleplate, above the soleplate, substantially along an axis parallel to the intersection between the planes 90 and 91.

A curved wall 92 (FIGS. 3 and 4) defines a fuel tank 50. This wall 92 bears against the beam 18V and can transmit lateral thrust 93 against said beam.

In particular in the event of the aircraft that includes this structure crashing, the vertical forces 96 (FIG. 4) acting on the wall 18V can lead to said wall 18V rupturing, as shown diagrammatically in FIG. 6, and can lead to the beam 18V becoming separated to form two portions: a top portion 18V1, and a bottom portion 18V2 that comprises the soleplates 54 that remain secured to the wall 18H-18H1. This rupture can take place specifically along the zones of weakness 45 made in the form of gaps in the plies of the jackets 19 of the beam 18V.

In order to ensure that energy absorption by the wall 18V is optimized during a crash, it is desirable for the top portion 18V1 to be deflected little if at all by the lateral thrust 93.

On this assumption, the walls 18H-18H1 and 18V-18V1-18V2 are maintained in a relative disposition that is substantially perpendicular by two section members 51 extending on either side of the bottom end of the beam 18V.

As shown in the left-hand portions of FIGS. 3 and 4, each of the two hollow section members 51 presents five plane strips or faces extending parallel to the longitudinal axis 94 of the section member:

- a first face 51A of the section member 51 rests on the soleplate 54 and serves to assemble the section member with the walls 18V and 18H;
- a second face 51B extends along and facing the bottom end of the jacket 19 of the wall 18V being spaced apart by a small distance 95 therefrom (FIG. 4);
- a fifth face 51E rests on and is secured to the wall 18H; and
- the third and fourth faces 51C and 51D interconnect the faces 51B and 51E.

These faces form a hollow bar presenting a section with an open outline that is approximately in the shape of a question mark.

These section members thus serve to hold the walls 18H to 18V in a relative disposition that remains substantially unchanged in the event of the bottom of the beam 18V being damaged or ruptured, whether that results from an impact (crash) in the vertical direction 96 (FIG. 4), or from lateral thrust 93 (FIGS. 4 and 6) in a direction that is substantially horizontal.

What is claimed is:

1. An aircraft structure comprising:
    a first wall and a second wall disposed within a fuselage of an aircraft, the first wall comprising two jackets each defining a plane disposed on either side of an intermediate arrangement and including at least one soleplate whereby the first wall is secured to the second wall,
    the structure further comprising on either side of a bottom end of the first wall at least one elongate member extending in the form of a hollow bar facing a jacket and spaced apart therefrom, the at least one elongate member being secured to the soleplate and to the second wall and being arranged to serve as an abutment for a portion of the first wall that becomes separated from the soleplate as a result of the first wall rupturing,
    wherein the at least one elongate member includes a bearing face for bearing against a bottom portion of the first wall after rupture, which bearing face is substantially planar and extends substantially parallel to the plane of one of the jackets,
    the at least one elongate member including two of the elongate members disposed on either side of the first wall and co-operating with the soleplate to define a groove-shaped receptacle suitable for containing debris resulting from the first wall rupturing.

2. The structure according to claim 1, in which the walls form part of a compartment for receiving equipment, such as a fluid tank, capable of exerting lateral thrust against the first wall.

3. The structure according to claim 1, further comprising: a floor in which the first wall is in the form of a beam having its core extending along a first plane that is substantially perpendicular to the floor, and the second wall extends along a second plane that slopes little relative to the floor, and in which said walls extend under the floor.

4. The structure according to claim 1, wherein the elongate member is hollow and secured to the soleplate and to the second wall.

5. The structure according to claim 1, wherein the elongate member is made of a composite material and presents a cross-section that is substantially identical over its entire length, which cross-section presents an outline that is open, and wherein the jackets are made of a composite material.

6. The structure according to claim 1, wherein the elongate member extends parallel to the soleplate and above it.

7. The structure according to claim 1, wherein the jacket includes a zone of weakness in the form of a localized interruption in at least one layer of the jacket, this localized interruption extending above the soleplate, the elongate member extending above the interruption.

8. The structure according to claim 1, wherein each of the two jackets of the first wall includes at least one zone of weakness in order to encourage symmetrical degradation of the wall in the event of an impact in a direction contained in a plane along which the core of the first wall extends.

9. The structure according to claim 1, wherein the intermediate arrangement of at least one of the walls contains a cellular material such as a synthetic foam or a honeycomb structure.

10. A rotary wing aircraft, including the aircraft structure according to claim 1.

* * * * *